OR 3,794,412

United Stat[illegible]

Hill

[11] 3,794,412

[45] Feb. 26, 1974

[54] HOLOGRAPHIC MEMORY WITH IMAGE LOCATION CORRECTION

[75] Inventor: Bernhard Hill, Hamburg, Germany

[73] Assignee: U.S. Philips Corporation, New York, N.Y.

[22] Filed: Jan. 26, 1973

[21] Appl. No.: 327,130

Related U.S. Application Data

[63] Continuation of Ser. No. 197,891, Nov. 11, 1971, abandoned.

[52] U.S. Cl. .......................... 350/3.5, 340/173 LT

[51] Int. Cl. .......................................... G02b 27/00

[58] Field of Search .. 350/3.5, DIG. 2; 340/173 LT, 340/173 LM, 173 LS

[56] References Cited

UNITED STATES PATENTS 3,560,071 2/1971 Silverman et al. .................. 350/3.5

OTHER PUBLICATIONS

Harris, IBM Technical Disclosure Bulletin, Vol. 12, No. 3, Aug. 1969, pp. 416–417.

*Primary Examiner*—Ronald J. Stern
*Attorney, Agent, or Firm*—Frank R. Trifari

[57] ABSTRACT

An apparatus for digital deflection of a radiation beam, in particular for use in a holographic storage system, is described. It is shown that if the apparatus is provided with a system which digitally varies the beam direction and with a system which is capable of digitally displacing the radiation beam parallel to itself the defects due to optical elements which cooperate with the deflection apparatus may be compensated for.

1 Claim, 3 Drawing Figures

Figure 1:
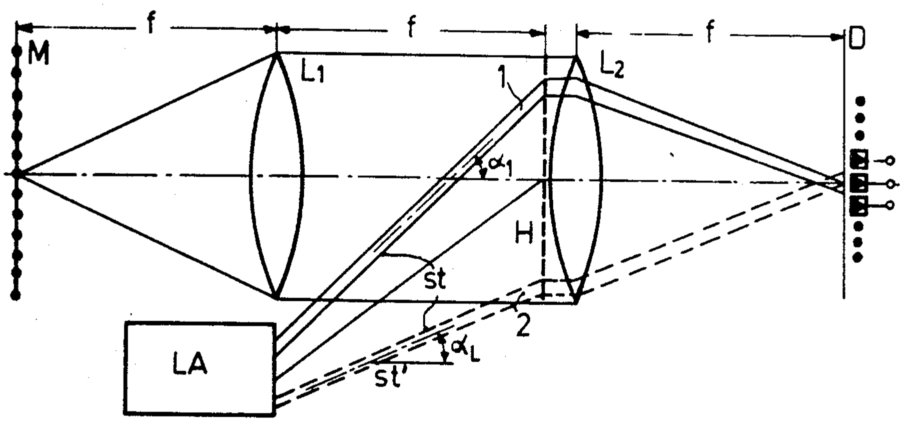

INVENTOR.
BERNHARD HILL
BY
AGENT

HOLOGRAPHIC MEMORY WITH IMAGE LOCATION CORRECTION

This is a continuation, of U.S. Pat. application Ser. No. 197,891, filed Nov. 11, 1971, now abandoned.

The invention relates to an apparatus for digital deflection of a beam of radiation, in particular for use in a holographic storage system.

Systems of storing optical information are known in which a large number of holograms are arranged in close proximity to one another in a storage plane, a comparatively large amount of information (for example $10^4$ bits) being stored in each hologram. Each individual hologram may be scanned by a beam of coherent radiation, for example a laser beam, which is deflected by means of a deflection system. Thus, the information content of the hologram is reconstructed in the form of a pattern of luminous dots. An image of this pattern is produced on an array of radiation-sensitive detectors. The electric output signals of these detectors may be electronically processed. In these processes of reconstructing and imaging the information, reconstruction or image defects may occur which depend upon the hologram used and the lenses employed respectively. These defects may result in that the matrix-shaped pattern of the luminous dots no longer corresponds to the matrix-shaped pattern of the radiation-sensitive detectors.

Both differential defects and positional defects may be produced. Differential defects result in distortions of an individual image point. Examples of such errors are a lack of definition of the image of a dot or an astigmatic distortion of its shape.

The term "positional defects" is used herein to mean the systematic displacement of an image point relative to the center of the radiation-sensitive detector associated with this image point.

It is an object of the invention to provide a deflection apparatus enabling defects produced in the optical elements traversed by the light beam to be compensated for. For this purpose the apparatus according to the invention is characterized in that both a system which digitally varies the beam direction and a system which is capable of digitally displacing the beam parallel to itself are provided. By means of this apparatus positional defects may be corrected by fully electronic means.

The digital system which causes the radiation beam to change direction may be built from polarization switches and birefringent prisms. The digital system which displaces the beam parallel to itself may be composed of polarization switches and plane-parallel plates. Other combinations of light deflection systems, however, may also be used, provided that they enable a radiation beam to be simultaneously modulated in angle and in position. For example, the angle modulation may be effected by means of a known acousto-optical deflection system, while the position modulation of the beam may be performed by means of polarization switches and birefringent elements.

It should be noted that deflection systems which contain only polarization switches and birefringent prisms and serve to change the direction of a beam, and deflection systems provided only with polarization switches and plane-parallel birefringent plates and are capable of displacing a beam parallel to itself, are known.

Figure 2:
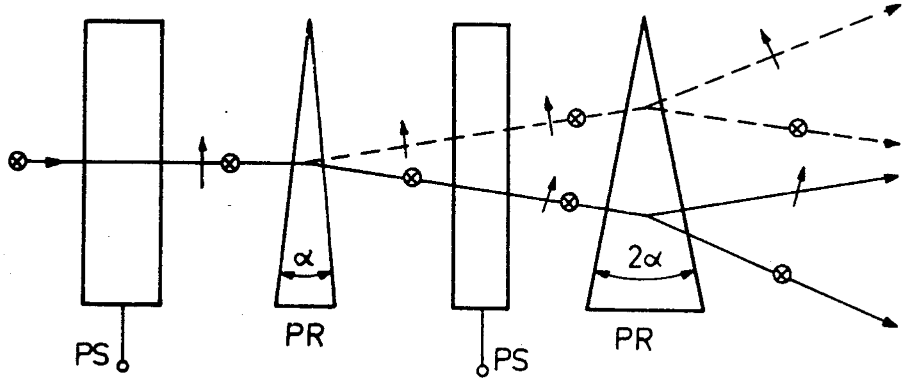
Figure 3:
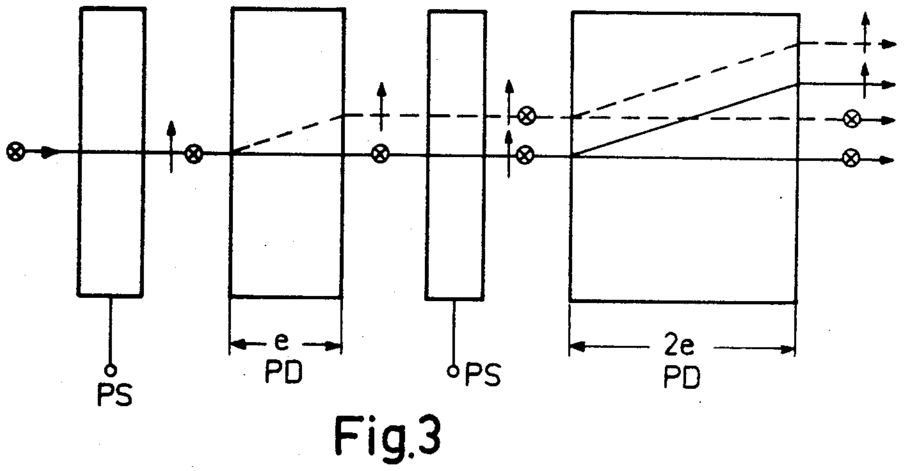

Embodiments of the invention will now be described, by way of example, with reference to the accompanying diagrammatic drawings, in which:

FIG. 1 shows schematically an embodiment of an arrangement for holographic storage of information, and FIGS. 2 and 3 show two-stage light deflectors including birefringent prisms and birefringent plane-parallel plates respectively.

In the arrangement shown in FIG. 1 the individual holograms are arranged in the Fourier transformation plane H of a lens $L_1$. Each hologram contains as information the Fourier transform of a given on/off pattern of an array M of point light sources. In the reconstruction process one of the holograms is illuminated by a beam St, for example, a laser beam, via a beam deflection device LA, the virtual image of the hologram being imaged via a Fourier transformation lens $L_2$ as a real image on an array D of radiation-sensitive detectors. When the same point of the array M of point light sources is stored in different holograms, the images of this point reconstructed from the various holograms may not lie exactly on one another on the associated detector. This effect, which is due to image defects inherent in the system, is illustrated in FIG. 1 by full lines St and broken lines St' which show the paths of two beams 1 and 2 respectively which form images of the same point of the array M.

In principle a correction of the position of a reconstructed point is always possible by changing the direction in which the reconstruction beam impinges on the hologram concerned. Thus, a small variation ($\Delta\alpha_1$) of the angle $\alpha_1$ at which the reconstruction beam is incident on the hologram plane will cause a displacement of the position of the reconstructed point by an amount of $f \cos \alpha_1 \cdot (\Delta\alpha_1)$.

In order to perform such a correction of the position in the reconstruction process, the deflection device must satisfy the following requirements:

1. The reference beam used in recording one of the holograms must illuminate the same area of the hologram plane H as does the reconstruction beam used for reconstructing this hologram.
2. The direction in which the reconstructing radiation beam impinges on the hologram plane must systematically be varied through a small angle relative to the direction of the reference beam when recording the hologram.

These two requirements can be fulfilled by a digital deflection device LA which according to the invention comprises a combination of two known deflecting systems.

The operation of these two deflecting systems will now be briefly described.

In the apparatus shown in FIG. 2 a combination of electronically controlled polarization switches PS and birefringent prisms PR is used to deflect the radiation beam. Depending on the position of a polarization switch the radiation which emerges from this switch is polarized in either of two directions at right angles to one another. The prisms PR deflect the radiation in either of two possible directions, depending on the polarization of the radiation. Thus a radiation beam may be deflected in $2^n$ different directions by means of an arrangement of $n$ stages which each comprise a polarization switch and a birefringent prism.

The deflecting device shown in FIG. 3 is built from electronically controlled polarization switches $P_s$ and plane-parallel birefringent plates PD, which plates produce a parallel displacement of the light beam in accordance with the direction of polarization of the incident light.

By arranging the two systems as shown in FIGS. 2 and 3 one behind the other and by suitably controlling them a beam of radiation may be deflected in different digital spatial directions and simultaneously be displaced parallel to itself through different digital distances.

Instead of being arranged one behind the other the two systems may also be intermingled.

By a lens system which succeeds the beam deflection device the various directions of the beam may be converted into positions in the focal plane of lens system. The various positions may be illuminated by controlling the polarization switches in the beam deflection device. Each position in the focal plane of the lens system corresponds to a given direction of incidence of the beam on the lens system. On the other hand, the direction in which a beam is incident on the focal plane is a function of the position of the beam which enters the lens system.

Positional defects in a hologram store may digitally be corrected by combining a composite beam deflection device which is capable of deflecting a radiation beam through different angles and of transversely displacing it through different distances and a lens system which effects a transformation of directions into positions.

It should be noted that the invention is not restricted to optical stores using Fourier transform holograms, but that it may also be used for correcting defects in other types of holograms.

The correct values of the individual deflecting stages can be found in the known literature on beam deflection devices. These values are determined by the value of the displacement in the detector plane to be corrected. For a system as shown in FIG. 1, for example, correcting a displacement through $\Delta x$ requires a parallel displacement of the radiation beam through $\Delta x/\cos\alpha$. Obviously, in a storage system not each single point of each individual hologram will be corrected, but only an average correction for the separate regions of the reconstructed image will be necessary.

It should be pointed out that in principle the modulation arrangement described may also be used to reduce the speckling in laser display systems, enabling the mechanical methods used so far to be replaced by methods of electronic control.

What is claimed is:

1. Holographic storage device, comprising a radiation source for providing a beam of radiation; a digital light deflector in the path of the radiation from the radiation source and comprising a first means for incrementally varying the angular direction of the radiation beam, and a second means for incrementally displacing the radiation beam parallel to itself; a planar array of individual holograms, a lens system in the path of the beam of radiation from the digital light deflector for focussing the beam on selected holograms in the array; and an array of radiation sensitive detectors positioned in the image plane of the array of holograms.

* * * * *

UNITED STATES PATENT OFFICE

CERTIFICATE OF CORRECTION

Patent No. 3,794,412 Dated February 26, 1974

Inventor(s) Bernhard Hill

It is certified that error appears in the above-identified patent and that said Letters Patent are hereby corrected as shown below:

On the cover sheet insert Foreign Priority Data:

-- Germany 205861 November 28, 1970 --.

Signed and Sealed this

***Fourteenth* Day of *November 1978***

[SEAL]

*Attest:*

RUTH C. MASON
*Attesting Officer*

DONALD W. BANNER
*Commissioner of Patents and Trademarks*